United States Patent
Ziegenfelder

(10) Patent No.: US 11,225,370 B2
(45) Date of Patent: Jan. 18, 2022

(54) PORTION CONTROL DISPENSER

(71) Applicant: SONOCO DEVELOPMENT, INC., Hartsville, SC (US)

(72) Inventor: Kurt A. Ziegenfelder, Florence, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 7 days.

(21) Appl. No.: 16/738,332

(22) Filed: Jan. 9, 2020

(65) Prior Publication Data
US 2021/0214149 A1     Jul. 15, 2021

(51) Int. Cl.
*B65D 83/00*     (2006.01)

(52) U.S. Cl.
CPC ................. *B65D 83/0055* (2013.01)

(58) Field of Classification Search
CPC .. B65D 83/005; B65D 83/0055; B65D 35/28; B65D 35/40
See application file for complete search history.

(56) References Cited

U.S. PATENT DOCUMENTS

| | | | |
|---|---|---|---|
| 2,772,817 A * | 12/1956 | Jauch ................. | F04B 43/0063 222/207 |
| 2,896,825 A | 7/1959 | Jackson | |
| 3,123,258 A | 3/1964 | Schiltz | |
| 3,523,637 A | 8/1970 | Stec | |
| 4,646,945 A * | 3/1987 | Steiner ................. | A47K 5/1209 222/207 |
| 4,776,495 A * | 10/1988 | Vignot ................. | A47K 5/1209 222/206 |
| 4,828,150 A * | 5/1989 | Bottger ................. | A47G 19/183 222/207 |
| 4,946,075 A * | 8/1990 | Lundback ............. | B67D 1/0001 222/181.3 |
| 5,000,354 A | 3/1991 | Lee et al. | |
| 5,312,018 A * | 5/1994 | Evezich ............ | B65D 83/0055 222/105 |
| 5,582,330 A | 12/1996 | Iba | |
| 5,595,104 A * | 1/1997 | Delaplaine .......... | B01F 3/04794 261/124 |
| 5,718,334 A * | 2/1998 | Demel .................. | A61F 9/0008 206/222 |

(Continued)

FOREIGN PATENT DOCUMENTS

DE     102012214111 B4     12/2014

*Primary Examiner* — Jeremy Carroll
(74) *Attorney, Agent, or Firm* — Nelson Mullins Riley & Scarborough LLP

(57) ABSTRACT

The invention is directed to a dispensing device comprising a rigid container, a flexible bladder, and a rigid stopper. The container is adapted to contain a product to be dispensed. The flexible bladder is disposed below and in fluid communication with the container. The bladder comprises a top end, a sidewall extending downwardly from the top end and terminates in a spout. The bladder is in a liquid tight engagement with the container and the product contained in the container is adapted to flow into the bladder. The rigid stopper is disposed within the flexible bladder and comprises a top end, and at least one sidewall extending downwardly from the top end, and terminates in an open bottom end. The stopper comprises a plurality of through holes.

19 Claims, 5 Drawing Sheets

(56) References Cited

U.S. PATENT DOCUMENTS

| | | | |
|---|---|---|---|
| 5,730,327 A * | 3/1998 | Stern | A47K 5/1209 |
| | | | 222/105 |
| 6,505,986 B1 | 1/2003 | Oder | |
| 6,755,357 B2 | 6/2004 | Duqueroie et al. | |
| 6,769,579 B2 | 8/2004 | Milian | |
| 7,635,070 B2 | 12/2009 | Cohen | |
| 8,220,666 B2 * | 7/2012 | Abe | B05B 11/3045 |
| | | | 222/181.2 |
| 8,646,659 B2 | 2/2014 | Swanick | |
| 9,114,903 B2 | 8/2015 | Iwatsubo et al. | |
| 9,168,495 B2 * | 10/2015 | Connors | B01F 3/04815 |
| 10,301,057 B2 | 5/2019 | Swanick et al. | |
| 10,377,555 B2 | 8/2019 | Gaston et al. | |
| 2012/0031277 A1 | 2/2012 | Hsieh et al. | |
| 2015/0274375 A1 * | 10/2015 | Kling | A47K 5/1211 |
| | | | 222/103 |
| 2018/0079559 A1 * | 3/2018 | Suzuki | B67D 1/0039 |

* cited by examiner

PORTION CONTROL DISPENSER

FIELD OF THE INVENTION

The present invention relates generally to dispensers for sauces, flowable foods, and other products, as well as methods for using such dispensers.

BACKGROUND

Restaurants and food service establishments often apply various food sauces to sandwiches, meats, desserts, and many other food products. For example, ketchup, mayonnaise, or mustard may be repeatedly applied to hamburgers or cold cut sandwiches in such a restaurant. Similarly, salad dressing may be repeatedly applied to salads. These and other sauces must be dispensed frequently and repeatedly in carefully controlled portions to ensure consistency in the foods served.

In some cases, a flexible container or squeeze bladder (also known as an udder) is utilized. The product contained within the flexible container or bladder, however, cannot be accurately dispensed therefrom. For example, the force with which a particular user squeezes may vary from one dispensing operation to another. Further, different users may use different squeezing timeframes, techniques, or strengths to dispense the product, resulting in inconsistent dispensing. Through much ingenuity and hard work, however, the inventors have developed a dispenser that allows controlled and consistent portioning of sauces and like products.

BRIEF DESCRIPTION OF THE DRAWING(S)

Having thus described the disclosure in general terms, reference will now be made to the accompanying drawings, which are not necessarily drawn to scale, and wherein:

SUMMARY

Figure 1:
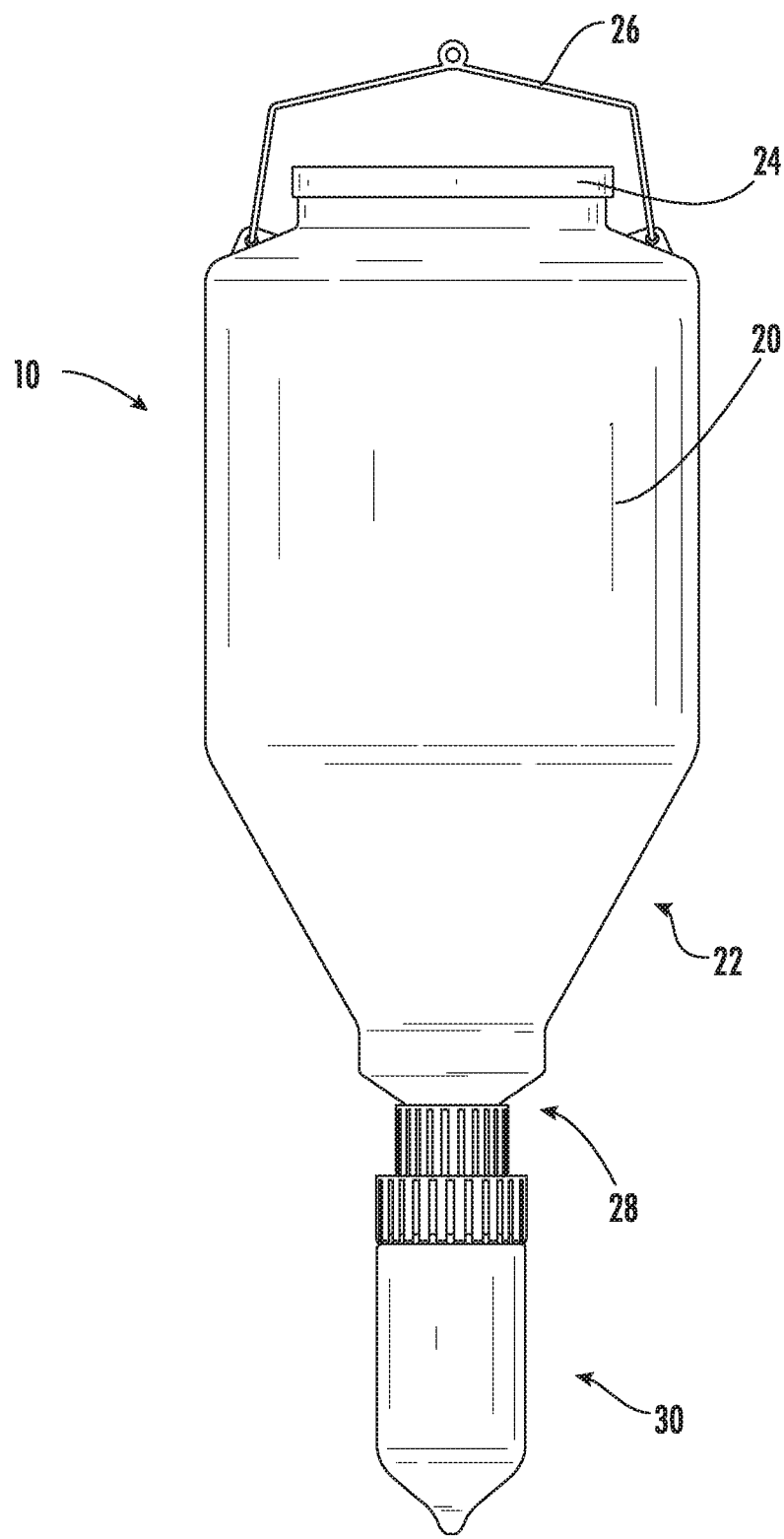
FIG. 1 is a front view of a dispensing device in an embodiment of the invention.
Figure 2A:
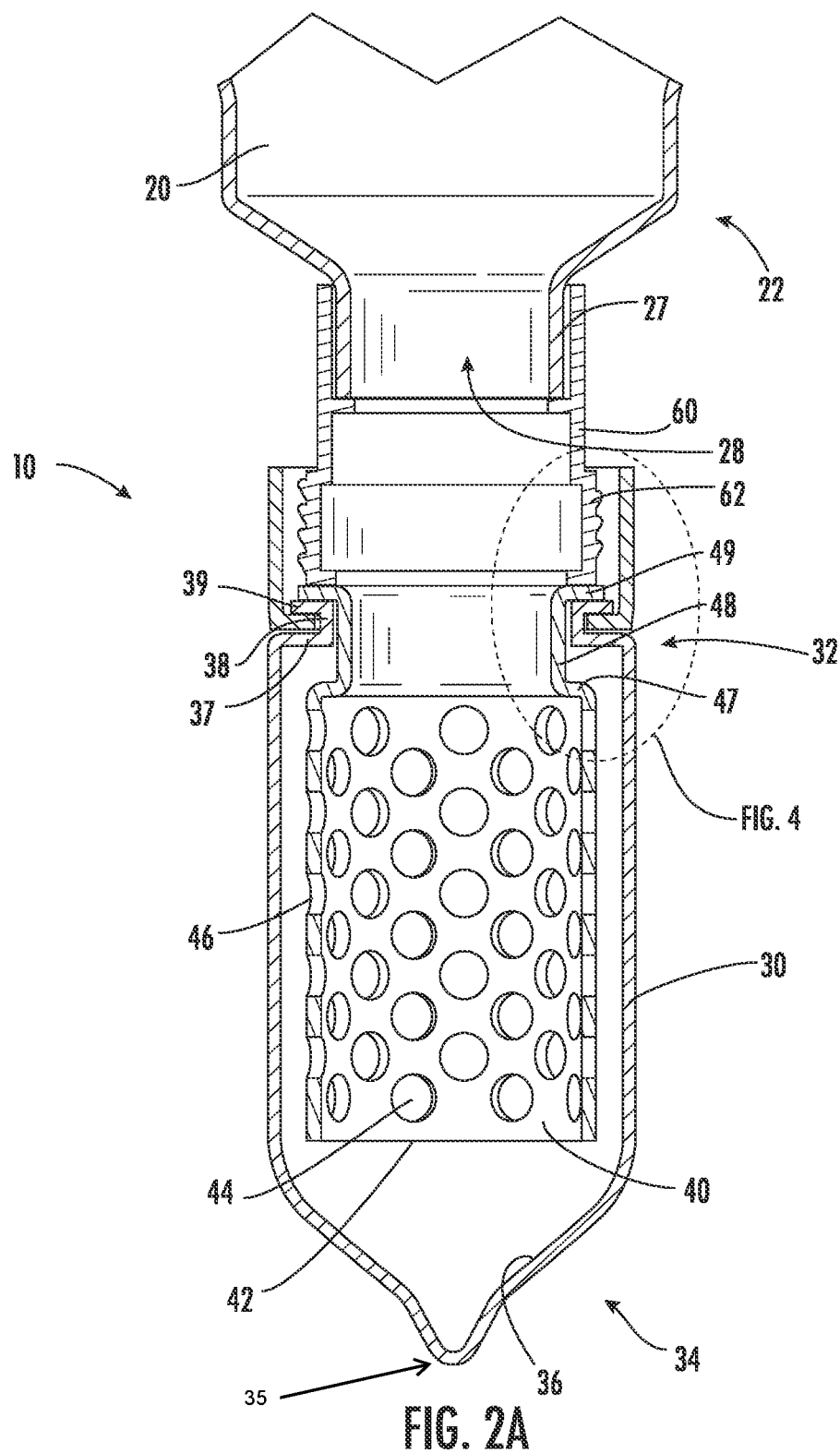
FIG. 2A is a cross-sectional view of a dispensing device in an embodiment of the invention.
Figure 2B:
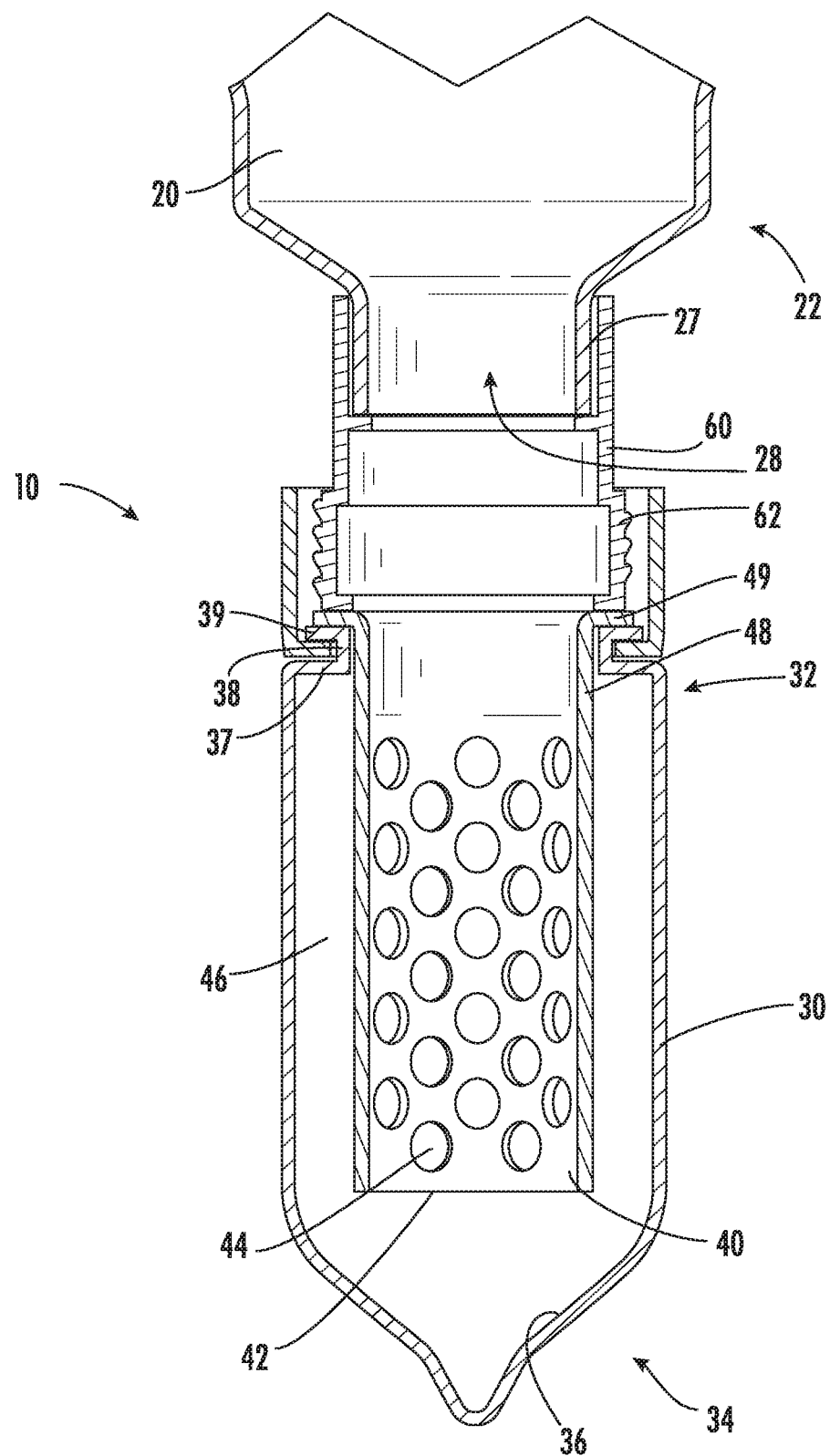
FIG. 2B is a cross-sectional view of a dispensing device in an embodiment of the invention, wherein the stopper has a smaller diameter than the stopper shown in FIG. 2A.
Figure 3A:
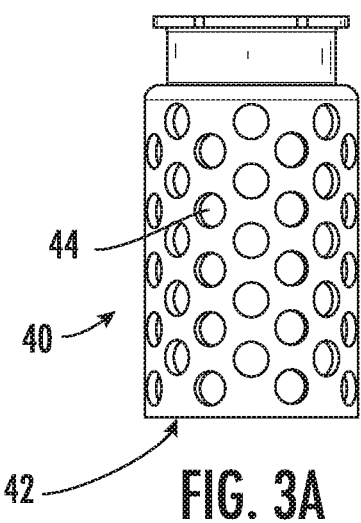
FIG. 3A is a front view of a stopper device in an embodiment of the invention.
Figure 3B:
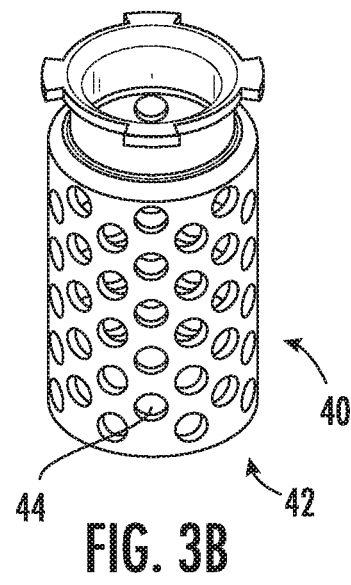
FIG. 3B is a perspective view of a stopper device in an embodiment of the invention.
Figure 3C:
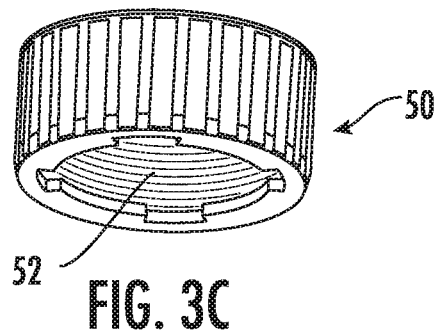
FIG. 3C is a perspective view of a locking nut in an embodiment of the invention.

In an aspect, the invention is directed to a dispensing device comprising a rigid container adapted to contain a product to be dispensed, the container comprising at a top end, a bottom end, and at least one sidewall connecting the top end and the bottom end, wherein the top end of the container comprises a first opening and the bottom end of the container comprises a second opening; a flexible bladder disposed below the second opening of the container, the bladder comprising a top end, a sidewall extending downwardly from the top end and terminating in a spout, wherein the flexible bladder is in a liquid tight engagement with the container and the product contained in the container flows into the bladder; and a rigid stopper disposed within the flexible bladder, the stopper comprising a top end and at least one sidewall extending downwardly from the top end and terminating in an open bottom end, wherein the stopper comprises a plurality of through holes.

In another aspect, the invention is directed to a dispensing device comprising: a rigid container adapted to contain a product to be dispensed, the container comprising at a top end, a bottom end, and at least one sidewall connecting the top end and the bottom end, wherein the top end of the container comprises a first opening and the bottom end of the container comprises a second opening; a flexible bladder disposed below the second opening of the container, the bladder comprising a top end, a sidewall extending downwardly from the top end and terminating in a spout, wherein the flexible bladder is in a liquid tight engagement with the container and the product contained in the container flows into the bladder; and a plurality of rigid stoppers, each adapted to be replaceably disposed within the flexible bladder, each stopper comprising a top end and at least one sidewall extending downwardly from the top end and terminating in an open bottom end, wherein the stoppers each comprise a plurality of through holes.

In still another aspect, the invention is directed to a dispensing device comprising: a rigid container adapted to contain a product to be dispensed, the container comprising at a top end, a bottom end, and at least one sidewall connecting the top end and the bottom end, wherein the top end of the container comprises a first opening and the bottom end of the container comprises a second opening; a plurality of flexible bladders, each bladder adapted to be disposed below the second opening of the container, each bladder comprising a top end, a sidewall extending downwardly from the top end and terminating in a spout, wherein when affixed to the container, each flexible bladder is in a liquid tight engagement with the container and the product contained in the container flows into the bladder; and a rigid stopper disposed within the affixed flexible bladder, the stopper comprising a top end and at least one sidewall extending downwardly from the top end and terminating in an open bottom end, wherein the stopper comprises a plurality of through holes.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the dispenser 10 is generally designed to dispense liquids, sauces, powders, and semi-solid food products, it may be utilized with any products (edible or inedible, food or non-food) which can be made to flow without great difficulty, have a flowable viscosity, or which have a semi-solid consistency. The dispenser 10 may be particularly well suited for high volume restaurants, such as fast food restaurants. The sauces contemplated herein may include but are not limited to ketchup, mustard, mayonnaise, barbeque sauce, sour cream, salad dressings, butter, margarine, jellies, soft cheeses, and flavoring sauces. Similarly, the dispenser 10 may be utilized for shampoo, conditioner, hair products, lotions, soaps, and the like.

Speaking generally, the dispensing device of the invention is a wall-mounted device or is removably hung on a wall or other fixture. In an embodiment, the dispensing device is not a hand-held device. However, depending on the size and weight of the device, it could be contemplated as a hand-held device in certain embodiments. In an embodiment, the dispensing device is well-suited for repetitive, multiple applications of sauce, in an assembly line fashion or any other application method.

In an embodiment, the dispensing device 10 comprises a container 20 that houses the sauce or condiment. The container 20 may comprise any shape or configuration known in the art. In an embodiment, the container 20 may comprise thermoformed or injection molded plastic. In an embodiment, the container 20 may be rigid or have rigid walls. In some embodiments, the container 20 has an internal volume which can maintain a plurality of portions of the sauce or condiment to be dispensed. In an embodiment, the internal volume of the container 20 is such that the weight of the product maintained within the container naturally flows downwardly based upon gravitational forces.

In an embodiment, the container 20 may have an opening within or about its upper end. In an embodiment, a cap 24 may be disposed on or over the upper end of the container 20, covering the opening in the upper end. The cap 24 may be a snap-fit cap or a screw cap. The container 20 may have a flange, snap-fit rim or threads, as the case may be, to receive the cap 24. The cap 24 may be removable and the dispensing liquid, sauce, or condiment may be inserted into the container 20 through the opening in the upper end of the container 20.

In an embodiment, the container 20 may be hung or affixed to a permanent fixture within a service establishment, such as a wall or post. In this embodiment, the container 20 may comprise a hanger mechanism 26, which allows the container to be hung from a hook, secured in a location, or the like. In this embodiment, the device 10 may be designed to be used in its secured position. That is, the device 10 is secured to a wall, post, or beam. Food may be passed beneath the device 10, manually, using a conveyor belt, in an assembly line fashion, or in any other manner, and the device may be used to dispense sauces as the food passes beneath.

In an embodiment, the container 20 may be tapered 22 at its lower end. At the lower, or tapered end 22 of the container 20, the container 20 may have a narrowed or elongated neck portion 27. The neck portion 27 may be generally cylindrical in nature. In some embodiments, however, the lower neck portion 27 of the container 20 may have other configurations, such as an elliptical or ovular cross section. The neck portion 27 may terminate in a bottom open end 28. The bottom opening 28 may be of a smaller diameter than the top opening of the container 20, in an embodiment. In some embodiment, the external surface of the neck portion 27 may have screw threads adapted to receive mating screw threads.

In an embodiment, a bladder 30 may be affixed to the container 20, adjacent or below the bottom opening 28 of the container. In an embodiment, the bladder 30 is separate from the container 20. In an embodiment, the bladder 30 is separateable from the container 20.

The bladder 30 may, in an embodiment, comprise a flexible material, such as a flexible plastic or a rubber material. In an embodiment, the bladder 30 comprises a different material than that of the container 20. In an embodiment, the bladder 30 may generally have an elongated, udder-like shape. In some embodiments, the bladder 30 may be generally cylindrical or tubular. Any shape known in the art may be utilized for the bladder 30. The bladder 30 may have a diameter which is convenient for grasping and squeezing.

The bladder 30, in an embodiment, may have an upper end 32 which is similar to or the same in diameter as the bottom opening 28 and/or the neck 27 of the container 20. The bladder 30, in an embodiment, may have a lower end 34 which is tapered. The lower end 34 of the bladder 30 may terminate in a dispensing hole, spout, or valve 35.

In use, the bladder 30 may be grasped by a user and squeezed, creating internal pressure. The flexible bladder 30 reacts to the pressure by dispensing the sauce downwardly, via the spout or valve 35. Once the pressure inside the bladder 30 has been relieved via the dispensing of the sauce, the user releases the bladder 30, and the pouch spout or valve 35 may close. The bladder 30 is automatically refilled with condiment/sauce due to the volume of condiment/sauce contained within the container 20. The device 10 is automatically ready for another dispensing application.

In an embodiment, the internal volume of the bladder 30 is substantially less than the internal volume of the container 20. In this embodiment, the weight of the sauce contained within the container 20 (due to the internal volume of the container 20 being filled) allows the bladder 30 to stay filled with sauce. For example, the container 20 may be sized to contain 20 or 50 or 100 portions of sauce, while the bladder 30 may be sized to contain only 2 or 4 or 5 portions of the sauce. The relative size differences and internal volume differences between the container 20 and the bladder 30 are important to maintaining a full volume of sauce within the bladder 30, as will be more fully explained herein.

In a particular embodiment of the invention, a stopping device 40, or stopper, is disposed within the bladder. The stopper 40 may be generally cylindrical or tubular in shape, though any shape may be contemplated. For example, a stopper 40 having an ovular or elliptical cross section may be utilized in the invention. In an embodiment, the stopper 40 comprises a rigid material, such as a food-safe plastic or metal. In an embodiment, the stopper 40 is inflexible. The stopper 40 may have a length which is similar to that of the bladder 30, in an embodiment. The length of the stopper 40 may not extend, in an embodiment, into the tapered portion 34 of the bladder 30. In an embodiment, the stopper 40 is removably affixed to the container 20. In an embodiment, the stopper 40 is removably affixed to the container 20 and the bladder 30.

In an embodiment, the stopper 40 comprises a bottom end 42 that is open and not tapered. For example, the stopper 40 may be cylindrical with an open bottom end. In an embodiment, the stopper 40 comprises a plurality of through holes 44. In an embodiment, the through holes 44 circumvent the stopper 40. In an embodiment, the through holes 44 comprise about 50% of the surface area of the stopper 40. In an embodiment, the through holes 44 comprise more than about 50% of the surface area of the stopper 40. In an embodiment, the through holes 44 are spaced equidistance throughout the surface area of the stopper 40. In an embodiment, the through holes 44 are disposed in a staggered pattern. The through holes 44 may be any size known in the art which will allow sauces or condiments to pass through.

In some embodiments, the through holes 44 are circular, but the through holes can be any shape known in the art. For example, the through holes 44 could be ovular, elliptical, triangular, square, teardrop shaped, tapered, diamond shaped, or the like. Likewise, the through holes 44 could comprise elongated shapes, such as elongated ovals or rectangles, stretching lengthwise or widthwise about the stopper 40. The open bottom end 42 and through holes 44 of the stopper 40 allow the sauce or product contained within the device 10 to flow easily in and out of the stopper.

In an embodiment, the bladder 30 and the stopper 40 work in conjunction to control the amount of product to be dispensed. When a user squeezes the bladder 30, the force of the user's squeeze is effectively stopped when his or her hand reaches the stopper 40. The user cannot continue to squeeze the bladder 30 once she grasps the stopper 40, eliminating over-dispensing of the product. The stopper 40 acts as a physical stopping point for squeezing of the bladder 30. In an embodiment, the stopper 40 is not free-floating within the bladder 30.

In an embodiment, the diameter of the stopper 40 is selected based upon the amount of product to be dispensed and the viscosity or thickness of said product. For example, if the stopper 40 has a greater diameter, a user squeezing the bladder 30 will reach the stopper 40, stopping the dispensing function at that point and limiting the amount of product dispensed. On the other hand, if the stopper 40 has a lesser diameter, a user squeezing the bladder 30 will dispense more product before reaching the stopper 40. Thus, the present invention eliminates the variability between dispensing amounts being based upon the variable strengths of the users. In an embodiment, the distance between the bladder 30 inner wall 36 and the stopper 40 outer wall 46 is related to the amount of product to be dispensed. The greater the distance between the bladder 30 inner wall 36 and the stopper 40 outer wall 46, the greater the amount of product that will be dispensed. Likewise, the lesser the distance between the bladder 30 inner wall 36 and the stopper 40 outer wall 46, the lesser the amount of product that will be dispensed.

In an embodiment, the product contained within the dispenser 10 may be displaced as the bladder 30 wall is inwardly distorted. Once the stopper 40 is reached, further inward distortion of the bladder is not possible or becomes very difficult, indicating to the user that the full portion has been dispensed.

In some embodiments, the invention may comprise a kit having a plurality of stoppers 40. For example, a first stopper 40 may have a diameter of X and may be designed to dispense 1 ounce of a flowable product. A second stopper 40 may have a diameter of 2X and may be designed to dispense ½ ounce of a flowable product. A third stopper 40 may have a diameter of 3X and may be designed to dispense ¼ ounce of a flowable product. Each of the stoppers 40 may be packaged as a kit to be used with the container 20 and bladder 30 of the invention.

Similarly, the invention may comprise a kit having a plurality of bladders 30 with a singular stopper 40. For example, a first bladder 30 may have a diameter of X and may be designed to dispense ¼ ounce of a flowable product. A second bladder 30 may have a diameter of 2X and may be designed to dispense ½ ounce of a flowable product. A third bladder 30 may have a diameter of 3X and may be designed to dispense 1 ounce of a flowable product. If each bladder 30 is used with a single stopper 40, changing the distance between the bladder wall and the stopper wall will control the portion size which is dispensed. Each of the bladders 30 may be packaged as a kit to be used with the container 20 and stopper 40 of the invention.

Likewise, the invention may comprise a kit having a plurality of bladders 30 and a plurality of stoppers 40. In this embodiment, the kit may include directions for dosage or portion size based upon the combinations of bladders 30 and stoppers 40.

In an embodiment, the size of the stopper may be indicated by the shape of the through holes 44. For example, the largest stopper 40 in a kit may have circular through holes 44. The smallest stopper 40 in a kit may have square through holes 44. In this way, it is easy to identify which stopper 40 should be used with which condiment.

In an embodiment, the upper end 32 of the bladder 30 comprises a shoulder 37, adjacent a neck 38, and in some embodiments, the neck 38 may be adjacent a flange 39. In this embodiment, the shoulder 37 may be generally horizontal, or generally perpendicular to the sidewall of the bladder 30. In an embodiment, the neck 38 of the bladder 30 may be generally vertical, or generally parallel with the sidewall of the bladder 30. The flange 39 of the bladder 30 may be generally horizontal, or generally perpendicular the sidewall of the bladder 30. In an embodiment, the shoulder 37, neck 38, and/or flange 39 of the bladder 30 may contact and receive the stopper 40. In an embodiment, the shoulder 37, neck 38, and/or flange 39 of the bladder 30 may interlock with the stopper 40. In an embodiment, the connection between the shoulder 37, neck 38, and/or flange 39 of the bladder 30 and the relevant portions of the stopper 40 may be liquid tight.

In an embodiment, the upper end of the stopper 40 may comprise a shoulder 47, adjacent a neck 48, and in some embodiments, the neck 48 of the stopper 40 may be adjacent a flange 49. In this embodiment, the shoulder 47 may be generally horizontal, or generally perpendicular the sidewall of the stopper 40. The neck 48 may be generally vertical, or generally parallel with the sidewall of the stopper 40. The flange 49 may be generally horizontal, or generally perpendicular the sidewall of the stopper 40.

In an embodiment, at least a portion of the neck 38 of the bladder 30 is disposed adjacent at least a portion of the neck 48 of the stopper 40. In an embodiment, the stopper 40 is located on the interior of the bladder 30. Thus, in this embodiment, the stopper neck 48 is disposed interior of the bladder neck 38. In an embodiment, the engagement between the neck of the bladder and the neck of the stopper is liquid tight.

In an embodiment, at least a portion of the stopper flange 49 is adjacent at least a portion of the bladder flange 39. In an embodiment, the stopper flange 49 and the stopper neck 48 are in intimate contact with the bladder flange 39 and the bladder neck 38, respectively. In an embodiment, the stopper flange 49 and the stopper neck 48 are nested with the bladder flange 39 and the bladder neck 38.

Figure 4:
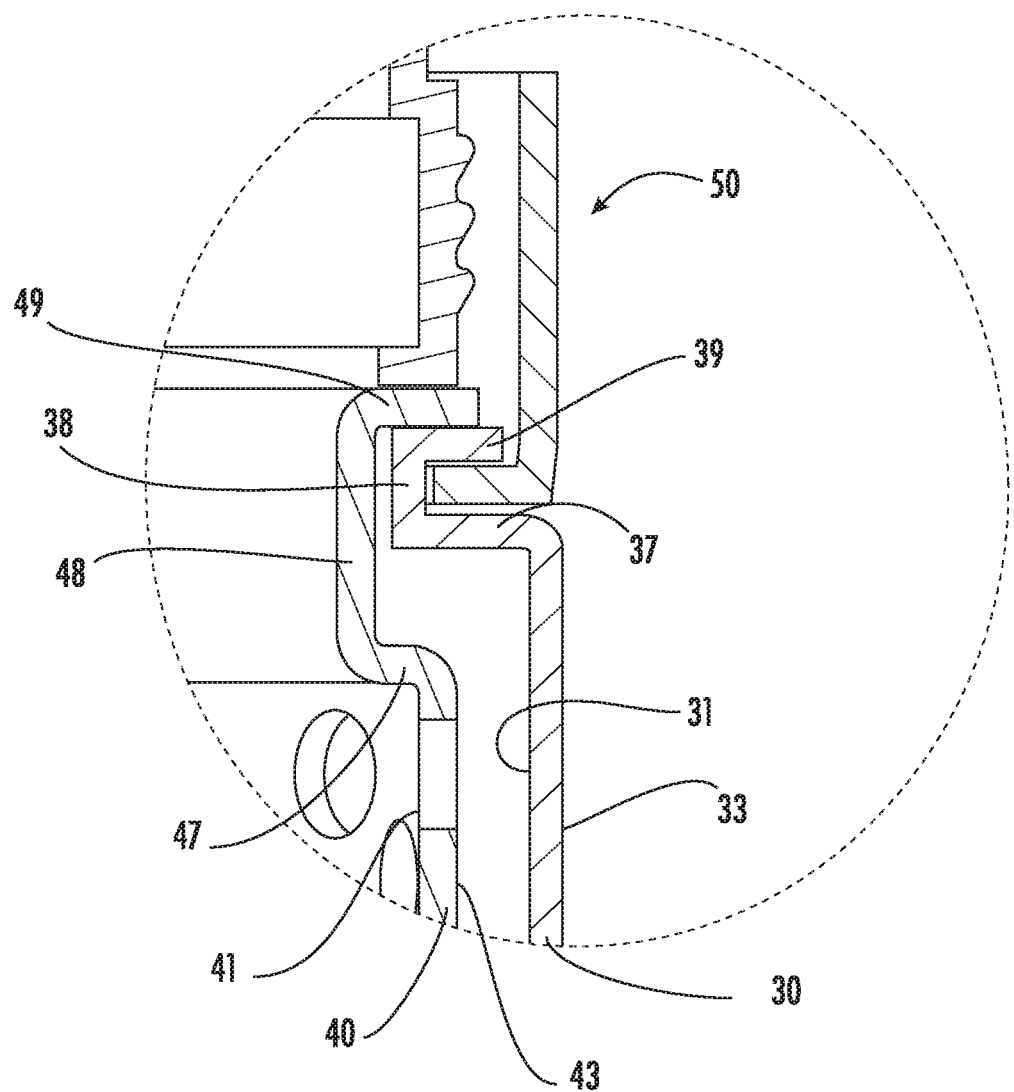
FIG. 4 illustrates an exploded cross-sectional view of a dispensing device in an embodiment of the invention.

With reference to FIG. 4, the stopper 40 may have an inner surface 41 and an outer surface 43. Likewise, the bladder 30 may have an inner surface 31 and an outer surface 33. At least a portion of the stopper 40 outer surface 43 may be in contact with the inner surface 31 of the bladder 30, preferably in the shoulder, neck, and/or flange region. In an embodiment, the shoulder 37 of the bladder 30 is not in contact with the shoulder 47 of the stopper 40. In an embodiment, the sidewall of the bladder 30 is not in contact with the sidewall of the stopper 40, other than when the bladder is compressed for the purpose of dispensing a product.

In an embodiment, the stopper 40 is inserted into the bladder 30 prior to attaching the bladder 30 to the container 20. In another embodiment, the stopper 40 and the bladder 30 are manufactured as a single component. In another embodiment, the stopper 40 and the container 20 are manufactured as a single component. In a different embodiment, the stopper 40 may comprise a plurality of stoppers, each having a different diameter. In this embodiment, the diameter of the stopper determines the amount of product to be dispensed. Thus, the invention may comprise a kit including one or more bladders 30 and a plurality of interchangeable stoppers 40.

In an embodiment, the bladder 30 and stopper 40 are affixed to the container 20 below the open bottom end 28 of the container 20. In an embodiment, the open bottom 28 of the container may have a shape which is symmetrical with that of the bladder 30 and/or stopper 40 (i.e. cylindrical, for example). In this embodiment, the diameter of the stopper neck 48 and/or bladder neck 38 may be similar or the same as the diameter of the open bottom end 28 of the container 20.

In an embodiment, the bladder 30 and stopper 40 may be secured to the container 20 via a locking nut 50. That is, there may be screw threads on the exterior surface of the bottom end of the container 20 and mating screw threads 52 on the interior surface of the locking nut 52. The screw threads of each respective component may interlock and seal the interface between the container 20 and the bladder 30 closed. In an embodiment, the locking nut 50 may fit into and be disposed adjacent the outer surface 33 of the bladder 30, between the shoulder 37, neck 38, and flange 39. The locking nut 50 may comprise ribs or other gripping features on its exterior surface.

In another embodiment, an adapter 60 may be fitted onto the bottom end 28 of the container 20. In this embodiment, the adapter 60 comprise screw threads 62 on its exterior surface and the mating screw threads 52 on the interior surface of the locking nut 52 may interface with the adapter screw threads 62, interlocking and sealing the interface between the container 20 and the bladder 30. In this embodiment, the adapter may comprise a check valve which prevents any product contained within the bladder 30 from returning upwardly into the container 20.

In any case, the stopper flange 49 may be compressed tightly between the bladder flange 39 and the component disposed above the flange 49, whether that is the adapter 60 or the container 20. The locking nut 50 may provide the compression force needed to maintain the components in a liquid tight configuration, in an embodiment.

In an embodiment, the bladder 30 must be full or nearly full of a condiment or other product to be dispensed in order to accurately dispense the proper portion. For example, if the bladder 30 is designed to contain 5 ounces of product, but only contains 2.5 ounces at the time of dispensing, the dispensing mechanism may not be accurate. If the condiment has the ability to move upwardly (due to an empty bladder portion), rather than downwardly through the valve or spout, the displacement action of the bladder 30 and dispenser 10 may not be accurate. Thus, in this embodiment, the container 20 disposed above the bladder 30 is necessary. Further, it is necessary in this embodiment to maintain enough condiment or product in the container 20 to keep the bladder 30 full for each dispensing action. Once the container 20 is emptied of product, it should be refilled through the cap 24.

In an embodiment, the container 20 and/or the bladder 30 have barrier properties, preventing the ingress or egress of gases, fluids, or other particles. In an embodiment, the bladder 30 comprises a spout which has an adhesive-fixed closure. In this embodiment, adhesive is positioned between two opposing faces of the bladder 30 in a spout area. The adhesive may be a resealable adhesive or a pressure sensitive adhesive. In this embodiment, when a sufficient amount of pressure is exerted on the pouch by the user, the adhesive between the two film faces fails and the spout pops open, releasing the condiment through the spout.

In other embodiments, the bladder 30 comprises a valve spout which, upon the exertion of internal pressure, opens and dispenses sauce and, upon the release of internal pressure, closes again, resealing the bladder 30.

In an embodiment, a user may select among a plurality of stoppers 40 and bladders 30 and assemble the dispenser as set forth herein. The stopper 40 may be inserted into the bladder 30. The bladder 30 and stopper 40 may then be affixed to the container 20, optionally using the locking nut 50. In use, the dispenser 10 may be secured on a wall, post, or beam, optionally using the hanger 26. The dispenser 10 may be filled with a product before or after securing it in place. Once a product is filled into the container 20, through the top opening, the flowable product may fill the interior of the container 20 and the bladder 30. The flowable product may flow through the stopper 40 as well (i.e. through the hole 44 and open end portion 42). In this embodiment, the bladder 30 is automatically refilled with the flowable product after each dispensing action, due to the flowable product being held within the container 20. The weight of the flowable product works with gravitational forces to keep the bladder full after each dispensing of the portion of the product.

As a user squeezes the bladder 30, the product exits the bladder through the valve at its bottom end. In some embodiments, the product cannot flow upwardly back into the container 20. Once the user contacts the stopper 40, the user stops squeezing the bladder, the product flow ceases and the user releases the bladder. The bladder 30 then expands back to its starting position and the bladder is again filled from product in the container 20. In an embodiment, a suction force is initiated when the bladder 30 is released, pulling product from the container 20 into the bladder 30. The process can then be repeated. As noted herein, the bladder 30 may be full of product prior to each dispensing process.

As discussed herein, each of the component parts of the invention is described separately, but it should be understood that the component parts may be permanently affixed to one another in any configuration. Likewise, the dispenser 10 may comprise one unitary structure which comprises the container, bladder, stopper, and any necessary locking nut or adapter.

The accompanying figures are provided for explanatory purposes and may not show all components described herein with respect to embodiments of the dispenser. In addition, those components that are illustrated are not necessarily drawn to scale. Thus, certain layers that are shown as the same thickness or thinner than other layers may actually be thicker than other layers, and so on.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A dispensing device comprising:
   a rigid container adapted to contain a product to be dispensed, the container comprising at a top end, a bottom end, and at least one sidewall connecting the top end and the bottom end, wherein the top end of the container comprises a first opening and the bottom end of the container comprises a second opening;

a flexible bladder disposed below the second opening of the container, the bladder comprising a top end, a sidewall extending downwardly from the top end and terminating in a spout, wherein the flexible bladder is in a liquid tight engagement with the container and the product contained in the container flows into the bladder; and a rigid stopper disposed within the flexible bladder, the stopper comprising a top end and at least one sidewall extending downwardly from the top end and terminating in an open bottom end, wherein the stopper comprises a plurality of through holes which extend between an external surface of the stopper sidewall and an internal surface of the stopper sidewall.

2. The dispensing device of claim 1 further comprising a removable cap which covers the first opening in the top end of the container.

3. The dispensing device of claim 1 wherein the device comprises a hanger mechanism.

4. The dispensing device of claim 1 wherein the container is tapered at its bottom end.

5. The dispensing device of claim 4 wherein the container bottom end terminates in an elongated neck portion surrounding the second opening.

6. The dispensing device of claim 1 wherein the bladder comprises a flexible plastic or rubber.

7. The dispensing device of claim 1 wherein the bladder is sized and configured to be grasped and squeezed by a human hand and thereby dispenses the product.

8. The dispensing device of claim 1 wherein the bladder additionally comprises, at its top end, a shoulder adjacent a neck and a flange adjacent the opposite side of the neck and the stopper additionally comprises, at its top end, a shoulder adjacent a neck and a flange adjacent the opposite side of the neck.

9. The dispensing device of claim 8, wherein the neck of the bladder and the neck of the stopper are in a removably secured configuration.

10. The dispensing device of claim 8, wherein the flange of the bladder and the flange of the stopper are in a removably secured configuration.

11. The dispensing device of claim 8, wherein a space is disposed between at least a portion of the sidewall of the bladder and at least a portion of the sidewall of the stopper.

12. The dispensing device of claim 11 wherein the space between the sidewall of the bladder and the sidewall of the stopper determines an amount of product to be dispensed.

13. The dispensing device of claim 8, wherein a space is disposed between the sidewall of the bladder, below the bladder shoulder, and the sidewall of the stopper, below the stopper shoulder.

14. The dispensing device of claim 1 wherein the through holes circumvent the stopper sidewall.

15. The dispensing device of claim 1 wherein the through holes are disposed in a staggered pattern.

16. The dispensing device of claim 1 wherein the through holes are sized and configured to allow the product to freely flow therethrough.

17. The dispensing device of claim 1 additionally comprising a locking nut securely affixing the container, bladder, and stopper.

18. A dispensing device comprising:
a rigid container adapted to contain a product to be dispensed, the container comprising at a top end, a bottom end, and at least one sidewall connecting the top end and the bottom end, wherein the top end of the container comprises a first opening and the bottom end of the container comprises a second opening;

a flexible bladder disposed below the second opening of the container, the bladder comprising a top end, a sidewall extending downwardly from the top end and terminating in a spout, wherein the flexible bladder is in a liquid tight engagement with the container and the product contained in the container flows into the bladder; and a plurality of interchangeable rigid stoppers, each adapted to be replaceably disposed within the flexible bladder, each stopper comprising a top end and at least one sidewall extending downwardly from the top end and terminating in an open bottom end, wherein each of the plurality of interchangeable stoppers comprise a plurality of through holes which extend between an external surface of the stopper sidewall and an internal surface of the stopper sidewall.

19. A dispensing device comprising:
a rigid container adapted to contain a product to be dispensed, the container comprising at a top end, a bottom end, and at least one sidewall connecting the top end and the bottom end, wherein the top end of the container comprises a first opening and the bottom end of the container comprises a second opening;

a plurality of interchangeable flexible bladders, each bladder adapted to be disposed below the second opening of the container, each bladder comprising a top end, a sidewall extending downwardly from the top end and terminating in a spout, wherein when affixed to the container, each flexible bladder is in a liquid tight engagement with the container and the product contained in the container flows into the bladder; and a rigid stopper disposed within the affixed flexible bladder, the stopper comprising a top end and at least one sidewall extending downwardly from the top end and terminating in an open bottom end, wherein the stopper comprises a plurality of through holes which extend between an external surface of the stopper sidewall and an internal surface of the stopper sidewall.

* * * * *